(12) United States Patent
Pickett

(10) Patent No.: US 10,555,646 B2
(45) Date of Patent: Feb. 11, 2020

(54) VENTED BACKPACK BLOWER

(71) Applicant: Carl Pickett, Columbia, SC (US)

(72) Inventor: Carl Pickett, Columbia, SC (US)

(*) Notice: Subject to any disclaimer, the term of this patent is extended or adjusted under 35 U.S.C. 154(b) by 122 days.

(21) Appl. No.: 15/801,913

(22) Filed: Nov. 2, 2017

(65) Prior Publication Data

US 2019/0125145 A1 May 2, 2019

(51) Int. Cl.
*A47L 5/14* (2006.01)
*A45F 3/14* (2006.01)
*A47L 5/36* (2006.01)
*A45F 3/10* (2006.01)
*A47L 7/04* (2006.01)

(52) U.S. Cl.
CPC .............. *A47L 5/14* (2013.01); *A45F 3/10* (2013.01); *A45F 3/14* (2013.01); *A47L 5/36* (2013.01); *A45F 2003/146* (2013.01); *A47L 7/04* (2013.01)

(58) Field of Classification Search
CPC ...... A47L 5/14; A47L 5/36; A47L 7/04; A45F 3/14; A45F 3/10; A45F 2003/146; A01G 20/47

USPC ................................................ 15/327.5, 405
See application file for complete search history.

(56) References Cited

U.S. PATENT DOCUMENTS

| 6,370,729 | B2 | 4/2002 | Miyamoto |
| 6,928,693 | B1 * | 8/2005 | Ericson .................. A01G 20/47 15/405 |
| 8,032,980 | B2 | 10/2011 | Basenberg, Jr. et al. |
| 2007/0294855 | A1 | 12/2007 | Iida et al. |
| 2014/0299297 | A1 | 10/2014 | Williams |
| 2015/0020345 | A1 | 1/2015 | Day |

* cited by examiner

*Primary Examiner* — David Redding
(74) *Attorney, Agent, or Firm* — Southeast IP Group, LLC.; Thomas L. Moses

(57) ABSTRACT

A backpack blower includes a motorized blower unit driven by an engine mounted to a frame having straps to be supported by a user's shoulders and having an air discharge pipe with openings which allow a portion of the air discharge to blow out onto a wearer's neck, head, and/or body. A deflector can further be added to direct the air discharge and the deflector can be adjustable. One or both of the deflector and openings can include a control device which allows for flow through the opening or deflector to be stopped or the volumetric flow rate of air passing therethrough can be adjusted.

4 Claims, 3 Drawing Sheets

VENTED BACKPACK BLOWER

BACKGROUND OF THE INVENTION

This invention relates generally to the field of lawn and garden tools and more particularly, to a backpack mounted blower. Backpack blowers have been used, typically in lawn and garden applications, to enable an operator to direct a stream of high velocity air toward one or more objects to propel the objects along the ground. Backpack blowers use gas or electric engines, including those which utilize battery packs, which are mounted on a frame carried on the back of the operator. Such devices are capable of developing flow velocities and flow volumes greater than the capabilities of ordinary hand-held blowers.

Various different backpack blowers are known in the current art. For example, U.S. Pat. No. 6,370,729 discloses a portable power working machine which has an L-shaped frame, a centrifugal blower fixed on a frame in a state that an intake port is opposed to a upright portion of the frame, and a cover having an upper portion spanned between an upper portion of the upright portion of the frame and the centrifugal blower and side portions extending from respective ends of the upper portion to a horizontal portion of the frame and spanned between a side portion of the upright portion and the centrifugal blower. A plurality of through-holes are formed in the upper portion of the cover, the through-holes communicating an interior space defined by the frame, the centrifugal blower and the cover with an exterior space on an outside of the interior space and having a size to block foreign matter in size greater than a predetermined value from passing through.

U.S. Pub. No. 2007/0294855 discloses a backpack blower comprising a blower which has an air intake opening, a backpack frame which is used to support the blower on the back of a user, and a back pad that is coupled to the backpack frame and contacts the back of the user. The back pad is composed of a cushion material and has a back surface contacting the back of the user and an opposite surface. The air intake opening communicates with at least a portion of the opposite surface, so that the air intake noise of the blower can reach at least the portion of the opposite surface.

U.S. Pat. No. 8,032,980 discloses a power tool which includes a power tool housing at least partially-encompassing an internal combustion engine and a harness on which the power tool housing is mounted. The harness has a pair of shoulder straps, a waist strap, and a panel connecting the shoulder' straps and waist strap. The power tool housing is mounted on a frame having at least one arcuate tool-supporting member with an upper end proximate the shoulder straps and a lower end proximate the waist strap. The tool-supporting member is shaped along its vertical length such that a middle portion of the member arcs away from the panel such that there is an air-circulation space between the power tool housing and the panel. In one embodiment, the power tool is a blower and the housing has an air intake port facing the air-circulation space.

Lastly, U.S. Pub. No. 2014/0299297 discloses vacuum systems and apparatuses for cooling a vacuum device. The apparatus can include a cooling device adapted to couple with a vacuum device, at least one cooling device air inlet, and a cooling device outlet. The air flows from the air inlets to the air outlet and combines with air disposed within the vacuum device. The system can include the cooling device, a vacuum housing, and a vacuum interface such that air flowing from the air inlets to the outlet flows from the vacuum interface to the vacuum housing biased with a negative pressure area. As a result, the air originating from the air inlets cools the air disposed within the vacuum housing upon mixing and the vacuum device cools, thus increasing the vacuum device's performance. Furthermore, heat transfer from the vacuum device to an operator reduces, thus improving the productivity and comfort of the operator. Each of the references mentioned above are hereby incorporated herein, in their entirety, by reference.

However, several issues exist with current art backpack blowers. In fact, the engines of the backpack blowers can generate a lot of heat along or near a user's back and oftentimes yard work is performed in summer when the weather is excessively hot. It is therefore an object of the present invention to provide an improved backpack blower that can divert a portion of its stream of high velocity air during operation onto a user to relieve some of the discomfort associated heat during its use.

SUMMARY OF THE INVENTION

The foregoing problem is overcome and other advantages are provided by a backpack blower having at least one opening along an air discharge pipe to divert a portion of its stream of high velocity air during operation generally onto a user, such as on a user's head, neck, or body during use.

In accordance with one embodiment of the present invention, a backpack blower is provided which includes a motorized blower unit having an engine and air discharge pipe mounted to a frame with attached straps. The motorized blower unit is driven by the engine to create a stream of high velocity air which is conducted through an air discharge pipe to propel objects along the ground. The air discharge pipe thereof also includes one or more openings which divert a portion of the stream of high velocity air conducted through the air discharge pipe onto a user to cool the user.

In accordance with another embodiment, the air discharge pipe can also include one or more deflectors to further direct air diverted through any openings onto a user with more precision than just through openings alone. Such deflectors may be adjustable, such as being able to spin, being louvered, or allowing for angular adjustment of an outlet thereof, to allow a user to adjust the direction of the diverted flow onto a desired spot. In a further embodiment, the deflectors or openings may also include a control device which allows such to be opened and closed or the volumetric flow rate of air there-through to be regulated for the comfort of the user. A backpack blower having openings, and possibly a deflector, may be produced either by being initially manufactured with such or by modification of a pre-existing backpack blower.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
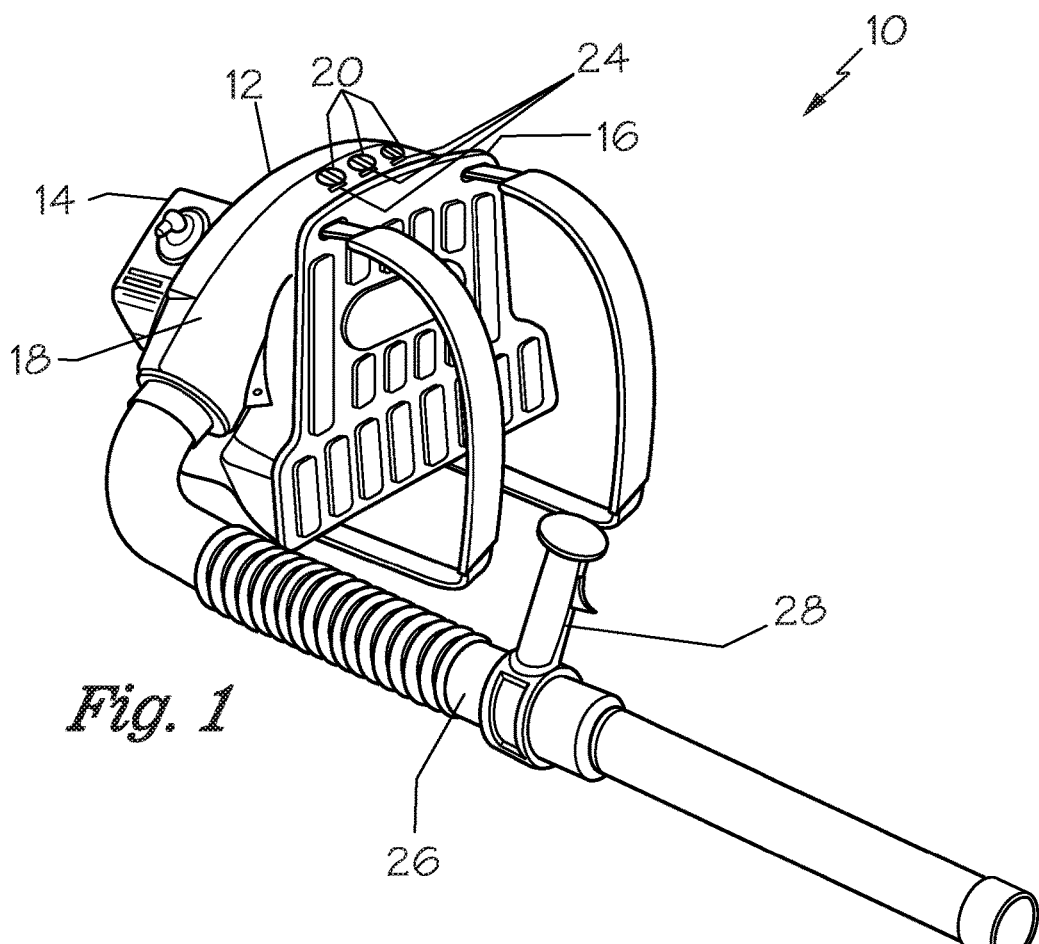
FIG. 1 is a top left perspective view of one embodiment of the backpack blower in accordance with one aspect of the present invention.

FIG. 1 illustrates one embodiment of a backpack blower 10 generally comprising a motorized blower unit 12 including an engine 14 mounted on a frame 1622 and an air discharge pipe 16 to channel the air generated by the blower unit 12 in operation. The air discharge pipe 16 is affixed to a blower nozzle assembly 26 to further direct air generated by the blower unit 12 in operation. The blower nozzle assembly 26 has a control handle 28 affixed thereto which may be grasped by a user to direct the blower nozzle assembly 26 and to allow the user to operate and control the blower unit 12.

The air discharge pipe 16 further includes openings 20 therein. The openings 20 allow a portion of the air channeled by the air discharge pipe 16 to be expelled out upon the user, thereby cooling the user. Optionally, the openings 20 may also have a control device 24 comprising adjustably louvered slats, thereby allowing a user to direct, control the volumetric flow rate of, and stop the stream of air expelled from the openings 20, as in FIG. 1. Although the control device 24 can comprise louvered slats, it is also foreseen that alternative means may be utilized to achieve similar functions. For example, a sliding plate with holes therein corresponding to the openings 20 may be utilized so that, when slid into a first closed position, the openings are blocked, and when slid into a second open position, the openings are unblocked. However, there are many other means for providing such functions and one skilled in the art will recognized that any suitable means for providing such functions may be employed. Thereby, thereby air passing through the openings 20 may be selectively regulated for the comfort of the user during use of the backpack blower 10.

Figure 2:
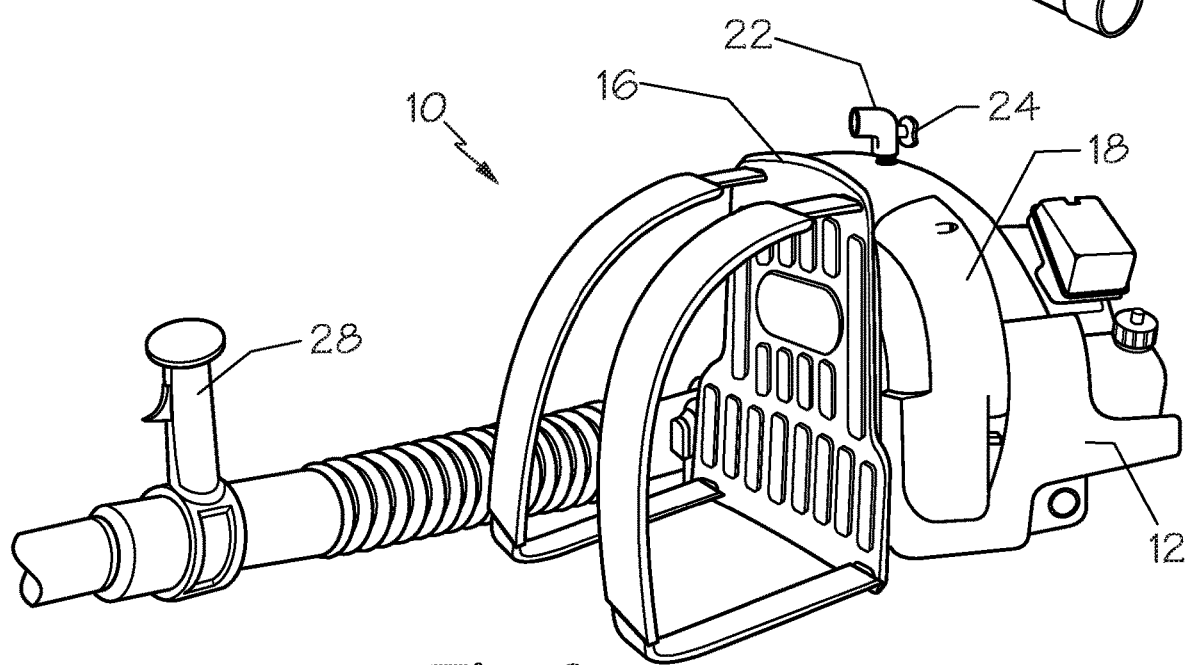
FIG. 2 is a top right perspective view of one embodiment of the backpack blower in accordance with one aspect of the present invention.

Referring now to FIG. 2, the air discharge pipe 16 of the backpack blower 10 is illustrated as further including a deflector 22, positioned over the openings 20. The deflector 22 allows for a more precise channeling of air expelled through the openings 20 toward a user. The deflector 22, as illustrated, is also adjustable allowing a user to adjust the angle of the outlet thereof and to spin such outlet towards the left and right of the blower 10. The deflector 22 thereof also has a control device 24 comprising a valve, thereby allowing a user to control the volumetric flow rate of air passing through the outlet of the deflector 22 or stop such flow altogether. Thereby, thereby air passing through the deflector 22 may be selectively regulated for the comfort of the user during use of the backpack blower 10. However, it is foreseen that a deflector 22 utilized by the present backpack blower 10 may not be adjustable or have a control device 24. Further, there are many means for providing adjustability and control over the flow of air through a deflector 22 and one skilled in the art will recognize that any suitable means for providing such functions may be employed or the openings may be used without deflectors, valves, or other control mechanisms.

Figure 3:
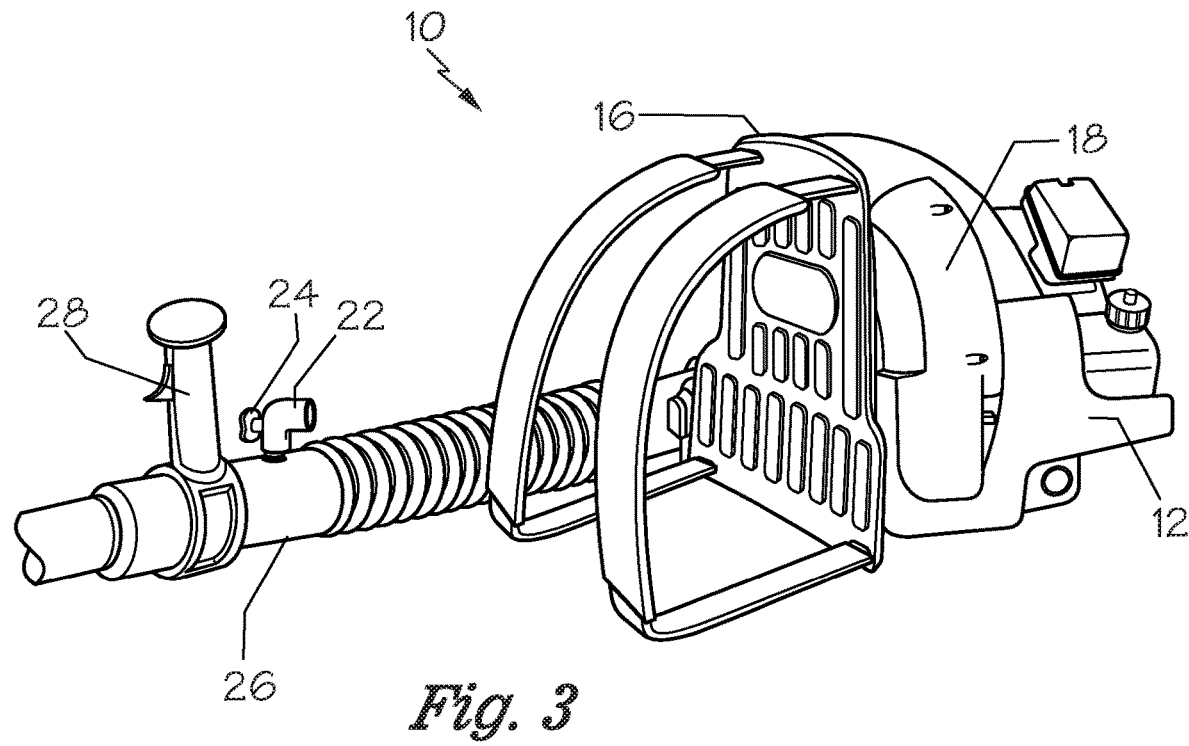
FIG. 3 is a top left perspective view of one embodiment of the backpack blower in accordance with one aspect of the present invention.
Figure 4:
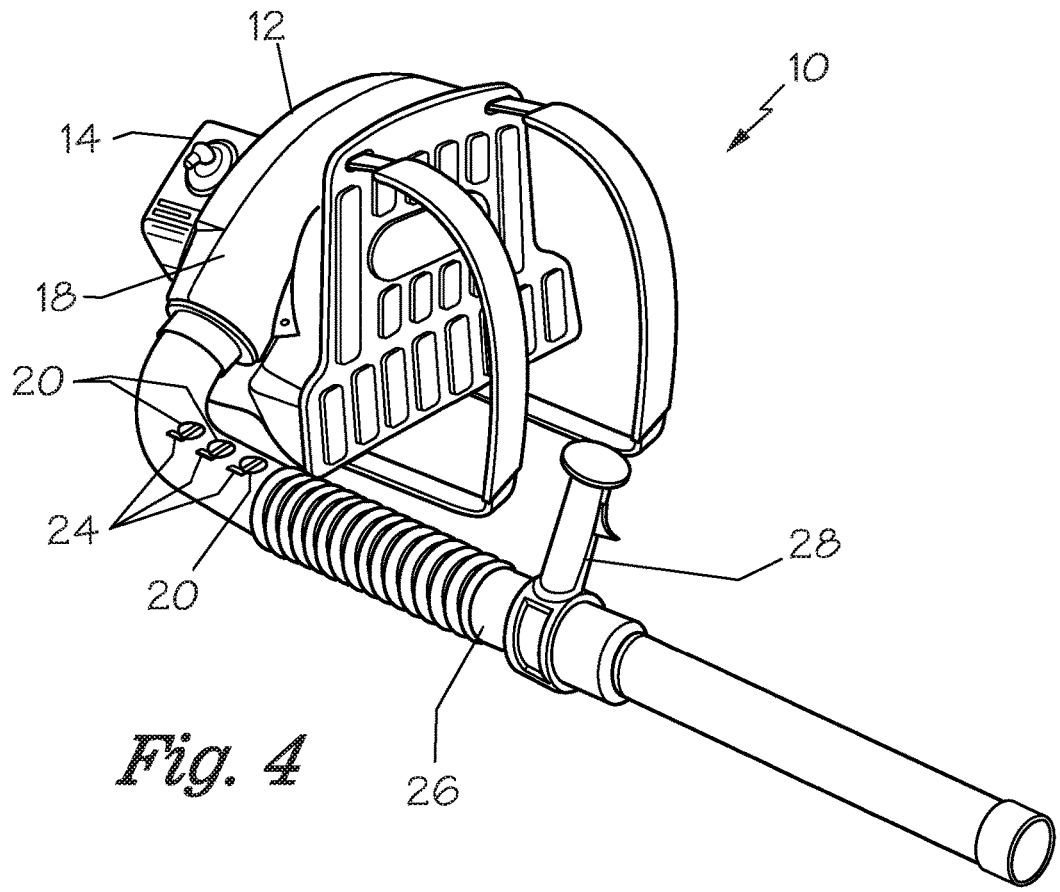
FIG. 4 is a top right perspective view of one embodiment of the backpack blower in accordance with one aspect of the present invention.

While the openings 20 and the deflector 22 are disclosed in FIGS. 1 and 2 as being disposed on the air discharge pipe 16 along a top portion of the backpack blower 10, it is foreseen that they may be disposed along additional portions of the air discharge pipe 16 and, alternatively, along a portion of the blower nozzle assembly 26, as seen in FIGS. 3 and 4. Thereby, air may be directed onto various portions of the user to provide comfort thereto during use of the backpack blower 10. Additionally, it is foreseen that a backpack blower 10 in accord with various embodiments may be produced by being initially manufactured with the aforementioned openings 20, and possibly deflectors 22, or may be produced by modification of a pre-existing backpack blower 10 with openings 20, and possibly deflectors 22, thereupon.

Figure 5:
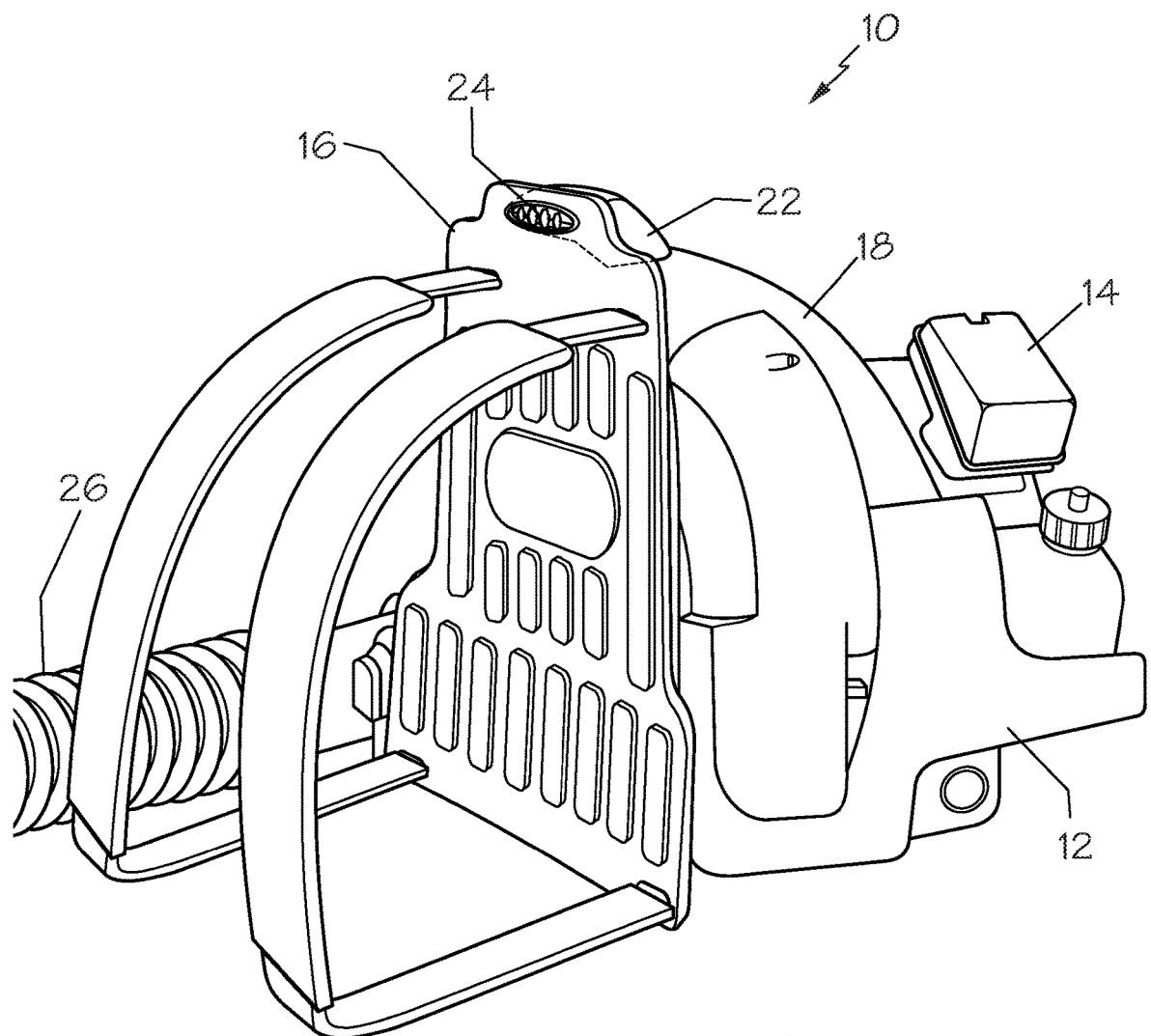
FIG. 5 is a top right perspective view of one embodiment of the backpack blower in accordance with one aspect of the present invention.

In a particular preferred embodiment shown in FIG. 5, the backpack blower 10 includes a flattened oval span of conduit, similar in shape to an upholstery vacuum tool, forming a deflector 22. The deflector 22 is attached to the air discharge pipe 16 of the backpack blower 10 along a top portion thereof, covering an opening 20 in the air discharge pipe 16 through which air may flow during use. It is further preferred that the deflector 22 also has a louvered vent control device 24 about an outlet to control the direction of air flowing there-through, as also shown in FIG. 5. Such deflector 22 is also preferably disposed to blow through an opening in the frame 16 of the backpack blower 10, providing a more durable deflector 22.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A backpack blower, comprising:
   a motorized blower unit having an engine and a curved air discharge pipe;
   a backpack frame configured to support blower on the back of a user wherein said curved air discharge pipe is secured in a fixed position to a top portion of said backpack frame;
   a blower nozzle assembly affixed to said air discharge pipe to direct air flow generated by said blower unit;
   at least one opening on said air discharge pipe which directs a portion of said air flow out of said discharge pipe toward a user wearing said backpack blower; and
   an adjustable deflector affixed to a curved upper portion of said air discharge pipe in operable connection with said at least one opening on said air discharge pipe which directs air passing through said at least one opening through an outlet of said deflector toward a rear portion of said user's neck while said user is wearing said backpack blower, wherein said adjustable deflector may be adjusted by said user to direct said air flow to a desired location on said user's back or neck.

2. The backpack blower of claim 1, wherein said deflector includes a control device on said deflector which allows a user to selectively stop air from passing through said outlet thereof.

3. The backpack blower of claim 1, wherein said deflector includes a control device which allows a user to adjust the volumetric flow rate of air passing through said outlet of said deflector.

4. The backpack blower of claim 1, wherein said deflector includes a control device which allows a user to selectively stop air from passing through said outlet of said deflector.

* * * * *